United States Patent [19]

Richards et al.

[11] 4,375,172
[45] Mar. 1, 1983

[54] BLOCKED CHANGE GEAR TRANSMISSION UTILIZING RESILIENT SHIFTING MECHANISMS AND IMPROVED JAW CLUTCH ASSEMBLY THEREFOR

[75] Inventors: Elmer A. Richards, Kalamazoo; John R. Vandervoort, Richland; Edward J. Bogema, Vicksburg, all of Mich.

[73] Assignee: Eaton Corporation, Cleveland, Ohio

[21] Appl. No.: 259,637

[22] Filed: May 1, 1981

Related U.S. Application Data

[63] Continuation of Ser. No. 947,808, Oct. 2, 1978, abandoned.

[51] Int. Cl.³ .......................... F16H 3/38; F16D 11/10
[52] U.S. Cl. ...................................... 74/339; 74/331; 74/438; 192/53 F; 192/108
[58] Field of Search .................. 74/339, 331, 438; 192/114 T, 108, 53 F

[56] References Cited

U.S. PATENT DOCUMENTS

| | | | |
|---|---|---|---|
| 2,375,790 | 5/1945 | Iavelli et al. | 192/53 F |
| 2,688,856 | 9/1954 | Heisler | 64/9 R |
| 2,846,038 | 8/1958 | Brownyer | 192/114 T X |
| 2,925,897 | 2/1960 | Snyder | 192/107 C X |
| 3,105,395 | 10/1963 | Perkins | 74/331 X |
| 3,265,173 | 8/1966 | Russell | 192/108 X |
| 3,335,616 | 8/1967 | Perkins | 74/331 |
| 3,373,625 | 3/1968 | Keller | 74/438 X |
| 3,424,289 | 1/1969 | Bessot | 192/108 |
| 3,503,280 | 3/1970 | Bopp | 74/339 |
| 3,799,002 | 3/1974 | Richards | 74/745 |
| 3,910,131 | 10/1975 | Richards | 74/331 |
| 3,921,469 | 11/1975 | Richards | 74/339 |
| 3,924,484 | 12/1975 | Richards | 74/331 |
| 3,983,979 | 10/1976 | Richards | 74/339 |
| 4,132,122 | 1/1979 | Richards | 192/53 F |
| 4,141,440 | 2/1979 | Richards | 192/53 F |
| 4,176,736 | 12/1979 | Richards et al. | 192/53 F |
| 4,186,618 | 2/1980 | Richards | 74/339 |
| 4,192,196 | 5/1980 | Bogema et al. | 192/53 F |
| 4,194,410 | 3/1980 | Richards | 74/339 |
| 4,290,515 | 9/1981 | Bogema et al. | 192/114 T |

FOREIGN PATENT DOCUMENTS

| | | | |
|---|---|---|---|
| 69127 | 11/1951 | Netherlands | 74/339 |
| 562693 | 9/1977 | U.S.S.R. | 192/108 |

*Primary Examiner*—Rodney H. Bonck
*Attorney, Agent, or Firm*—C. H. Grace; H. D. Gordon

[57] ABSTRACT

An improved, blocked, change gear transmission utilizing at least one improved resilient jaw clutch assembly to selectively engage a selected gear to a shaft is provided. The improved jaw clutch assembly comprises two axially engageable jaw clutch members and a blocker mechanism to prevent engagement of the jaw clutch members until the jaw clutch members are rotating at a substantially synchronous speed. Preferably, one of the jaw clutch members carries axially and radially outwardly extending external clutch teeth designed for selective interengagement with axially and radially inwardly extending internal jaw clutch teeth carried by the other jaw clutch member. The improvement comprises providing a back-lash between the interengageable clutch teeth which is substantially greater than the back-lash normally utilized with similar clutch assemblies, said increased back-lash being in the range of five to fifteen times greater than normal back-lash and preferably about ten times greater than normal back-lash.

7 Claims, 9 Drawing Figures

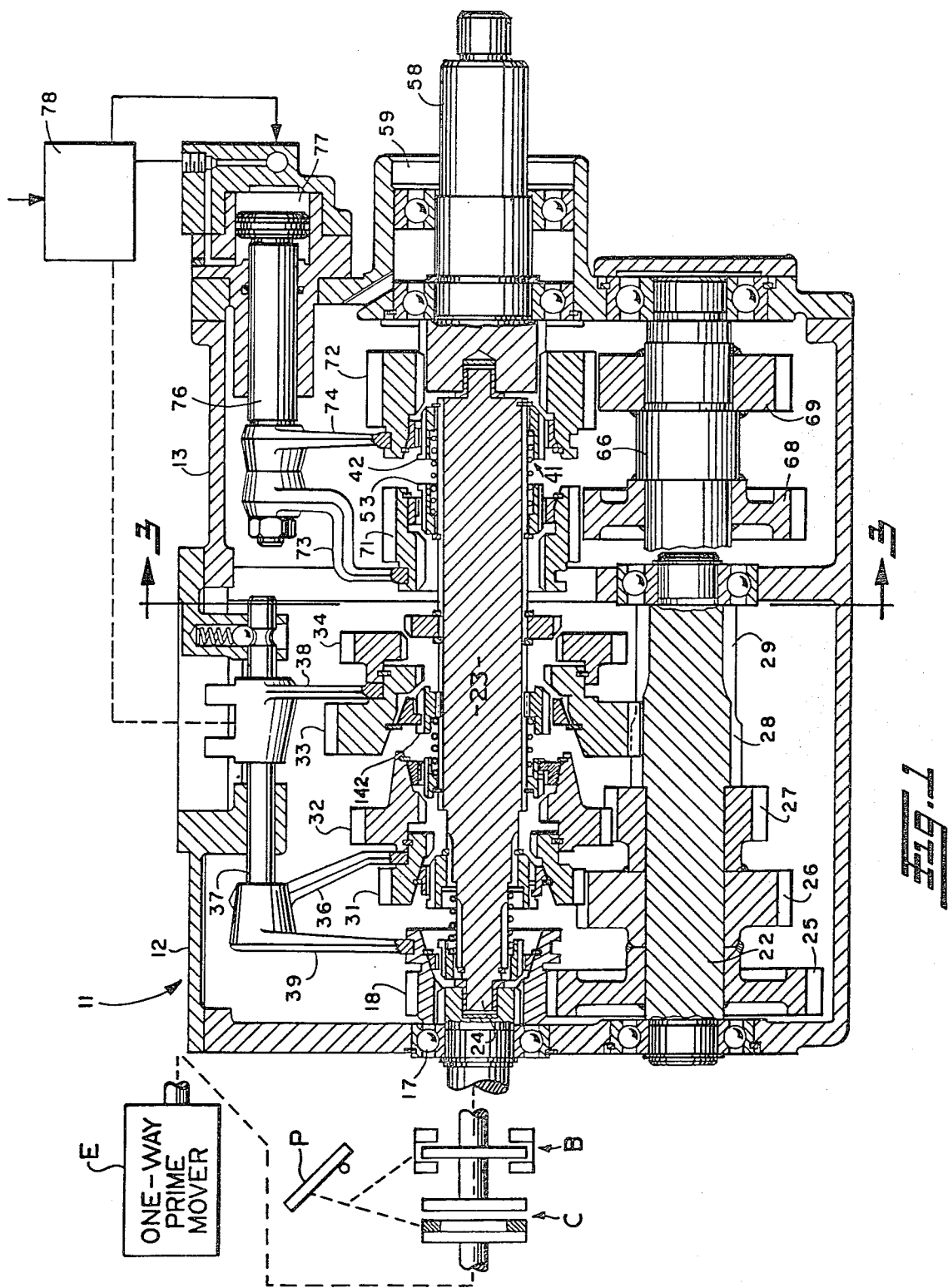

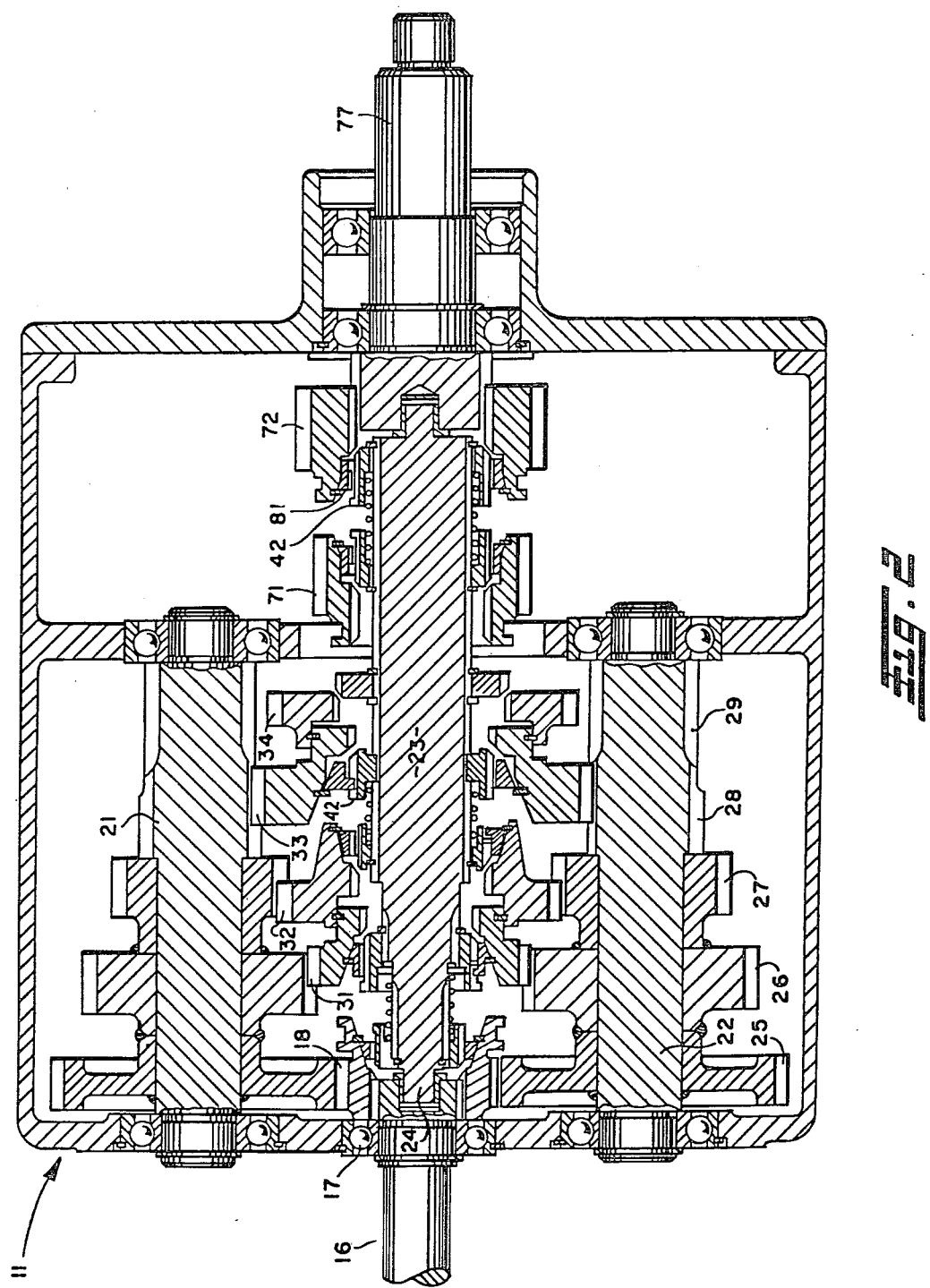

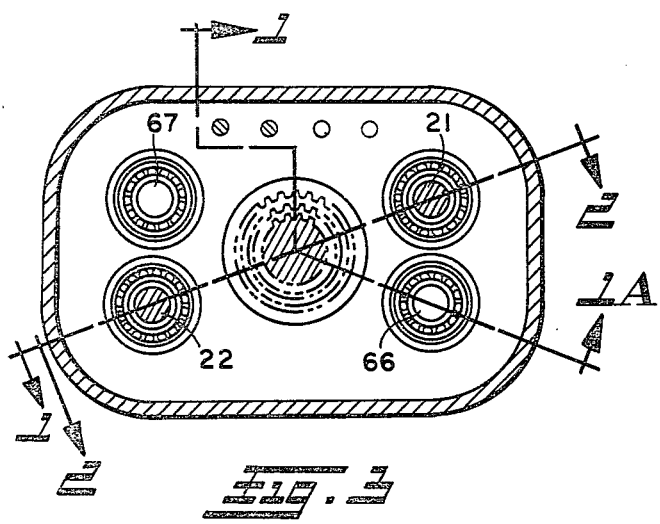
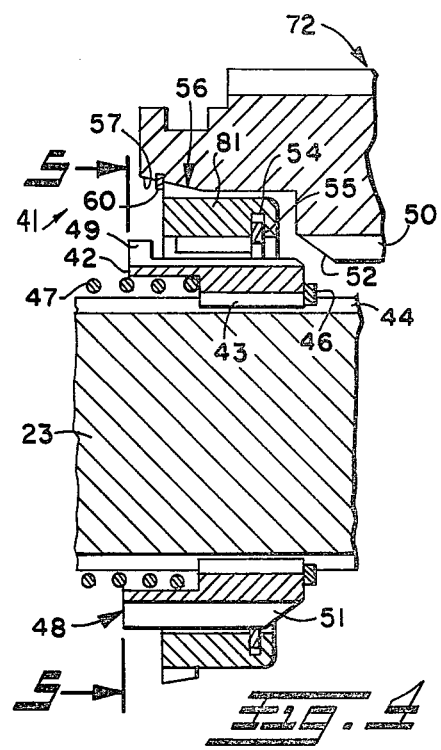
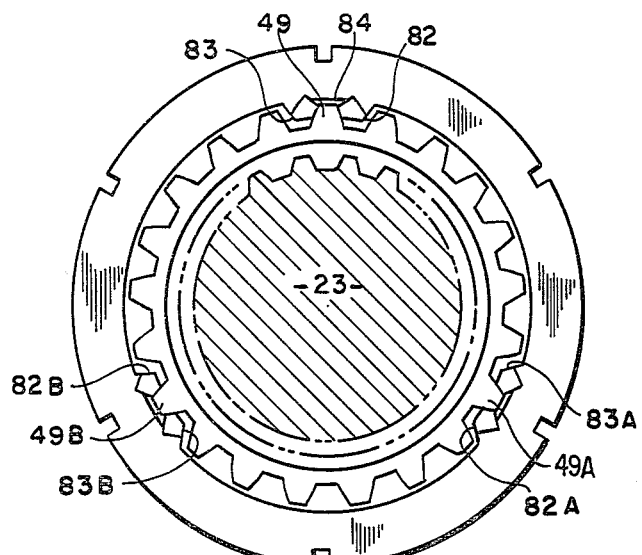
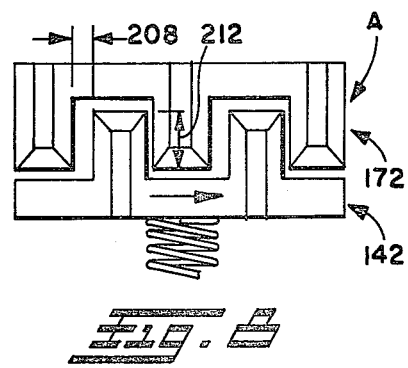
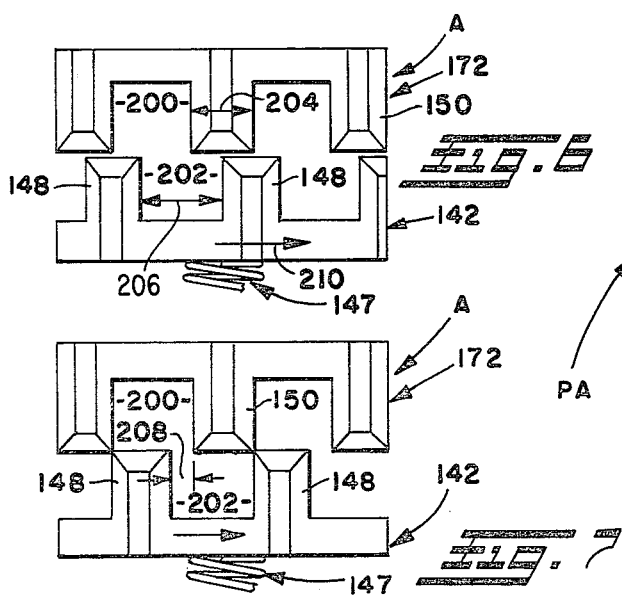
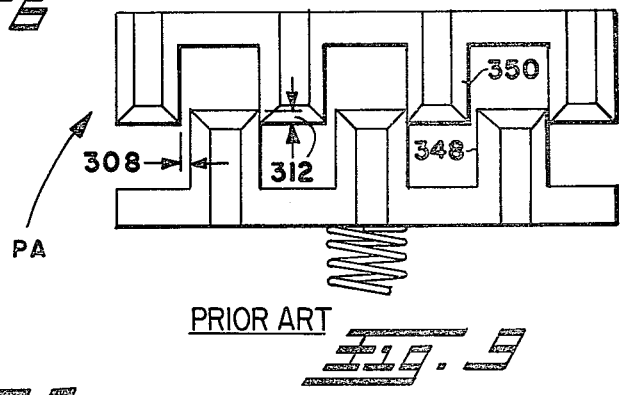

BLOCKED CHANGE GEAR TRANSMISSION UTILIZING RESILIENT SHIFTING MECHANISMS AND IMPROVED JAW CLUTCH ASSEMBLY THEREFOR

This is a continuation of application Ser. No. 947,808, filed Oct. 2, 1978 now abandoned.

BACKGROUND OF THE INVENTION

1. Field of the Invention

This invention relates to shiftable, blocked, change speed gear devices, preferably multiple countershaft floating main shaft transmission having resiliently yieldable shifting means utilizing blocker and jaw clutch assemblies for substantially simplifying shifting of the transmission, and in particular relates to shiftable, blocked, change gear transmissions utilizing improved axially engageable jaw clutch assemblies effective to allow more positive axial engagement of the interengageable clutch teeth of the jaw clutch members as the jaw clutch members pass through, or cross, synchronous.

2. Background of the Invention

In the design of transmissions, particularly heavy duty transmissions, such as for example are used in trucks, there has existed for a long time the problem of shifting the transmission to the various gear ratios, which problem is even greater when the transmission is provided with an auxiliary transmission section of the range or the splitter type for increasing the number of gear ratios. In most known transmissions, the shifting process is either relatively difficult and/or the shifting mechanism is relatively complex. Thus, there has been a continuing effort in the design of transmissions to improve the shifting, to improve the rapidity of shifting, to reduce the complexity of the shifting mechanism, and to reduce its costs. Hence, without detracting in any way from the operability or desirability of many of the shifting mechanisms previously known, it may be stated that in the present invention these general objectives are accomplished to even a greater degree than has been previously considered possible.

Particularly, most previously known transmissions have required a relatively high level of operator skill or necessarily utilized synchronizers, of which many different types are known, for causing the speed of the jaw or tooth clutch members to be substantially synchronized prior to permitting their interengagement during a shifting sequence from one speed ratio to another speed ratio. While the use of synchronizers does permit the shifting operation to be performed more easily, their use, as is already known, imposes certain requirements of weight, space and power which it would be desirable to ease, or avoid entirely.

These and other problems incident to previously known transmissions were set forth and acknowledged in U.S. Pat. Nos. 3,799,002, entitled "TRANSMISSION WITH RESILIENTLY LOADED MAIN SHAFT GEARS"; 3,910,131, entitled "TRANSMISSION WITH SNAP SHIFT"; 3,921,469, entitled "TRANSMISSION WITH RESILIENTLY LOADED MAIN SHAFT GEARS"; 3,924,484, entitled "SENSOR UNBLOCKING RAMPS"; and 3,983,979, entitled "SENSOR UNBLOCKING RAMPS"; all hereby incorporated by reference and assigned to the same assignee as the present application. Apparatus is disclosed in the above mentioned patents which effectively meets the problems while providing a reliable, effective and efficient transmission, particularly for heavy duty use.

While both forms of the inventions disclosed in said patents, namely, those using blockers and those not using blockers, are effective for carrying out the objectives thereof, it has been noted that for the usual reasons both noise and clutch tooth wear can be minimized by the use of blockers as set forth in said patents and since the data thereof a considerable amount of investigation has been carried out related thereto, both for simplifying of the blocker structure and for improving the operation of said blockers and of transmissions utilizing same. Blockers of various types are well known in the prior art and examples thereof may be seen by reference to the above mentioned patents and to U.S. Pat. No. 3,503,280, entitled "BLOCKER DEVICE", issued to W. C. Bopp, and assigned to the assignee of this application.

Blockers of the type utilized in the present invention and illustrated in the above mentioned patents are generally nondeformable devices designed to prevent, or block, the engagement of the axially engageable jaw clutch members of a jaw clutch when said members are rotating at substantially different speeds, i.e., are not substantially synchronized. Transmissions utilizing such blockers are referred to herein as "blocked transmissions". Blocked transmissions are transmissions utilizing blockers to prevent jaw clutch engagement if the members of the jaw clutch are not substantially sychronized. This is in contrast to "synchronized transmissions" which utilize synchronizer clutches to cause the jaw clutch members to be synchronized and to remain synchronized. The relatively nondeformable blockers utilized are generally retained on one clutch member for rotation therewith with a limited amount of relative rotation (3°-15°) provided. The one clutch member is usually that clutch member rotationally fixed to the transmission main shaft. The blocker and the one clutch member will define an array of first projections or teeth or the like which will allow the one clutch member to move relatively axially towards the other clutch member when in alignment but will block such relative axial movement when said blocker is rotated in either the clockwise or counterclockwise direction relative to the one clutch member. The blocker is designed to be in positive frictional contact with the second clutch member during an engaging operation and will thus tend to rotate with the second clutch member. Random frictional contact will usually cause, or tend to cause, the blockers to rotate with the second clutch members at times when a clutch engagement is not attempted.

By way of example, assuming the use of a relatively nondeformable blocker as disclosed in the above mentioned prior art and that the clutch members are rotating in a clockwise direction, if the first clutch member is rotating faster than the second clutch member, upon initiation of an engaging operation the blocker will be rotated counterclockwise relative to the first clutch member and the blocker will prevent axial movement of the first clutch member towards the second clutch member. If the second clutch member is rotating faster than the first clutch member, the blocker will be rotated clockwise relative to the first clutch member and the blocker will prevent axial movement of the first clutch member towards the second clutch member. If the first clutch member initially rotates faster, then slower than the second clutch member, the blocker would, relative to the first clutch member, rotate in a clockwise direction from an initial counterclockwise rotated position relative to the first clutch member towards a relatively clockwise rotated position. During the relative rotation, for at least a limited period of time, the blocker would align with the first clutch member and cease to block axial movement thereof towards the second clutch member. Such relative movement of the clutch members and the blocker is generally referred to as "passing through synchronous". The clutch will "pass through synchronous" or "cross synchronous" as the two clutch members reach a substantially synchronous rotation, and the clutch engaging operation, or the gear shift, should be completed at this time.

When utilizing resiliently biased blocked transmissions of the type described herein, the operator is simply required to select a desired gear and then to cause the clutch members associated with such gear to cross synchronous. The operator is not required to, and generally will not attempt to, maintain the clutch members at a substantially synchronous rotation as is the case with utilizing a nonblocked, nonsynchronous transmission.

As the clutch members of a blocked transmission will often only remain at a substantially synchronous rotation during the relatively limited period of time in which the members "cross synchronous", as opposed to a synchronized tranmission wherein the synchronizer clutches retain the members at a synchronous speed or a manual non-blocked transmission wherein the operator manually holds the clutch members at a synchronous speed, only a limited period of time is available for the axially interengageable clutch teeth to become sufficiently axially engaged to prevent tooth damage to the clutch teeth tips as the clutch members tend to rotate at an increasingly non-synchronous speed relative to each other. Applicants have discovered that in blocked jaw clutch assemblies wherein the back-lash between the interengageable clutch teeth is substantially equal to the back-lash normally utilized for a non-blocked clutch assembly, the period of time during which the clutch members rotate at a substantially synchronous speed was insufficient for the clutch teeth on the clutch members to become aligned for engagement and then to sufficiently axially penetrate, or axially engage, and thus damage or deterioration to the leading edges, or tips, of the interengageable clutch teeth often resulted.

SUMMARY OF THE INVENTION

In accordance with the present invention, many of the drawbacks of the prior art have been overcome by the provision of a blocked, change gear transmission utilizing at least one improved jaw clutch assembly which is effective to allow sufficient axial engagement, or axial penetration, of the axially engageable clutch teeth on the clutch members during the period of time during which the clutch members cross synchronous and remain at a substantially synchronous rotation to prevent or minimize damage to said clutch teeth. The above is accomplished by utilizing interengageable clutch members having a greater than normal back-lash between the clutch teeth thereof, said back-lash being in the range of five to fifteen times greater than the normal back-lash and preferably about ten times greater than normal back-lash. In the prior art transmissions of the manually engaged, non-blocked type, normal back-lash between the clutch teeth of the axially engageable clutch members was about 0.006 inches (0.015 cm). Applicants have discovered that by utilizing a back-lash in the range of 0.030 inches (0.076 cm), to 0.090 inches (0.228 cm), preferably about 0.060 inches (0.152 cm), that proper axial engagement, that is, proper axial tooth penetration, is achieved. While such increased back-lash is highly desirable and effective in a blocked, non-synchronized transmission utilizing resilient shifting mechanisms, such increased back-lash would be highly undesirable in a manually shifted, non-synchronized, non-blocked transmission as the increased back-lash would allow the operator to force such a transmission into engagement at substantially non-synchronous conditions which might result in severe damage to the jaw clutches and other components of such a transmission. Such increased back-lash is not desirable in a synchronized transmission as the clutch members of such a synchronized transmission are maintained in a synchronized condition by the synchronizer clutch and the increased back-lash might result in marginally undesirable operating characteristics without providing a needed benefit.

Accordingly, it is an object of the present invention to provide a new and improved blocked, change gear transmission with an improved jaw clutch assembly for use therewith.

Another object of the present invention is to provide a new and improved resiliently shifted change speed blocked transmission of the type having a main shaft, a plurality of main shaft gears selectively clutchable to said main shaft, at least one countershaft and including at least one improved jaw clutch assembly comprising a pair of axially interengageable jaw clutch members wherein the back-lash between the clutch teeth of said jaw clutch members is considerably greater than normal, preferably five to fifteen times greater than normal back-lash.

A further object of the present invention is to provide an improved blocked, resiliently shifted change gear transmission including a new and improved jaw clutch assembly of greater reliability and easier utilization which will substantially reduce or eliminate the occurrence of clutch tooth damage caused by insufficient axial penetration of the interengageable jaw clutch members.

These and other objects and advantages of the present invention will become apparent from a reading of the detailed description of the preferred embodiment taken in view of the accompanying drawings.

DESCRIPTION OF THE DRAWINGS

FIG. 1 is a cross sectional view of the improved, blocked, resiliently shifted transmission of the present invention utilizing improved jaw clutch assemblies wherein the jaw clutch assemblies comprise positive clutches and utilize blockers of the type described in the prior art, the main transmission portion thereof being taken along the lines I—I of FIG. 3 and the auxiliary transmission portion thereof taken along the line I—IA of FIG. 3.

FIG. 2 is a cross sectional view of the transmission of FIG. 1 taken substantially along the line II—II of FIG. 3.

FIG. 3 is a sectional elevational view taken along the line III—III of FIG. 1.

FIG. 4 is an enlarged fragmentary view of the jaw clutch-blocker structure utilized in connection with the present invention.

FIG. 5 is a sectional view of the jaw clutch and blocker structure taken substantially along the line V—V of FIG. 4.

FIGS. 6–8 are schematic representations of the improved jaw clutch assembly of the present invention at various relative operational positions thereof.

FIG. 9 is a schematic representation of the jaw clutch assemblies utilized in prior art devices.

DESCRIPTION OF THE PREFERRED EMBODIMENT

Referring now to the apparatus in detail, it will be recognized that a detailed disclosure of both the construction and operation of blockers and blocked transmissions utilizing same has been set forth and claimed in the above mentioned patents and reference is therefore made thereto for such details.

Certain terminology will be used in the following description for convenience in reference only and will not be limiting. The words "upwardly", "downwardly", "rightwardly", and "leftwardly" will designate directions in the drawings to which reference is made. The words "forward" and "rearward" will refer respectively to the front and rear ends of the transmission as same is conventionally mounted in the vehicle, being respectively the left and right sides of the transmission as illustrated in FIG. 1. The words "inwardly" and "outwardly" will refer to directions toward and away from, respectively, the geometric center of the device and designated part thereof. Said terminology will include the words above specifically mentioned, derivatives thereof, and words of similar import.

The term "blocked transmission" shall designate a change gear transmission wherein a selected gear is nonrotatably coupled to a shaft by means of a positive clutch and a blocker is utilized to prevent such engagement until the members of the positive clutch are at synchronous, such synchronous condition achieved by manual and/or automatic manipulation of the transmission input and/or output shafts to cause the clutch members associated with said shafts to cross synchronous but not achieved by frictional contact of the selected clutch members sufficient to cause one of the clutch members, and the apparatus associated therewith, to rotate with the other clutch member.

The term "synchronized transmission" shall designate a change gear transmission wherein a selected gear is non-rotatably coupled to a shaft by means of a positive clutch, attempted engagement of said clutch is prevented until the members of the clutch are at synchronous and frictional means associated with clutch members are sufficient, upon initiation of a clutch engagement, to cause the clutch members, and all members rotating therewith, to rotate at a substantially synchronous speed of rotation.

The improved blocked transmission of the present invention is illustrated in connection with a resiliently shiftable change speed transmission of the type having a floating main shaft and a plurality of substantially identical countershafts as may be seen in more detail by reference to the above mentioned U.S. Pat. Nos. 3,799,002 and 3,924,484. Although the improved transmission and improved jaw clutch-blocker assembly of the present invention is illustrated in connection with such a resiliently shiftable change speed transmission, it is understood that the improved transmission of the present invention may utilize any type of blocked positive clutch and is especially suited to utilize axially engageable jaw clutch structure.

Insofar as concerns the integration of the improved blocker and jaw clutch assembly of the present invention into the entire shiftable change speed transmission system, the blockers are placed between the two relatively axially slidable portions, or members, of at least one and preferably most or all of the transmission positive clutches and the usual friction means are provided for causing the blockers to tend to rotate with one of said members as the clutch members move relatively axially toward each other during a clutching procedure. One of said clutch members is often formed integrally with a main shaft gear as internal clutch teeth thereof. As the clutching procedure occurs, the blocker limits such relative axial movement until substantial synchronization between the clutch members involved in a given shift is sensed.

As may be seen by reference to U.S. Pat. Nos. 3,921,469 and 3,924,484, both above mentioned, there may further be provided means by which a significant axial drag with a minimum of rotational drag is provided constantly between the blocker ring and the clutch member blocked thereby. Thus, said blocker rings will be axially urged upon axial movement of said last named clutch element into engagement with the driving cone of the other clutch element and will thereby be held in proper position against the effect of its own inertia with respect to the gear associated therewith. This assures that, in most operating situations, the blocker rings will be in the desired position prior to contact with the blocking surface of the clutch. The general structural details and operation of resiliently shifted, blocked change gear transmissions is known in the prior art and will be described only briefly below.

Referring now to the drawings, there is illustrated a resiliently shiftable, change speed blocked transmission 11 having both a main transmission section 12 and an auxiliary transmission 13, each of which have a plurality of selectable ratios. The transmission illustrated is generally referred to in the art as a compound transmission and is of the splitter type of compound transmission. The main and auxiliary sections are both suitable enclosed by conventional housing means.

The blocked transmission 11 includes an input shaft 16 supported adjacent its rearward end by a bearing 17 and is provided with an input gear 18, nonrotatably connected thereto, as by splines. The input gear 18 simultaneously drives a plurality of countershafts at equal rotational speeds. In the illustrated embodiment, the transmission is provided with two countershafts, 21 and 22, disposed on diametrically opposite sides of the main shaft 23, which main shaft is coaxially aligned with the input shaft 16 and is provided with a pilot portion 24 on its forward end rotatably received within and supported by the rearward end of the input shaft 16.

The input shaft 16 is normally driven in one direction only by a prime mover, such as a Diesel engine E through a selectively operated, normally engaged, friction master clutch C. Clutch C may be disengaged by use of pedal P as is known in the prior art. The pedal P, when fully depressed, is effective to engage a normally disengaged input shaft brake B as is also well known in the prior art. Input shaft brake B may be replaced by any other type of normally disengaged input brake.

Each of the countershafts, 21 and 22, is provided with an identical grouping of countershaft gears, 25, 26, 27, 28 and 29 thereon, which groupings form pairs of gears, such as the pair of gears 26, of identical size and number of teeth and disposed on diametrically opposite sides of main shaft 23.

A plurality of main shaft drive gears 31, 32, 33 and 34 encircle the main shaft and are selectively clutchable thereto one at a time by yieldable clutch mechanisms, as described in greater detail hereinafter and in the above incorporated patents.

The main shaft gears 31, 32 and 33, encircle the main shaft 23, are in continuous meshing engagement with, and are floatingly supported by the diametrically opposite pairs of countershaft gears 26, 27 and 28, respectively, which mounting means and the special advantages resulting therefrom are explained in greater detail in U.S. Pat. Nos. 3,105,395 and 3,335,616, both assigned to the assignee of this application and hereby incorporated by reference. The main shaft gear 34 is the reverse gear and is in continuous meshing engagement with a pair of countershaft gears 29 by means of conventional intermediate or idler gears (not shown). The forwardmost countershaft gears 25 are continually meshed with and driven by the input gear 18 for causing simultaneous rotation of the countershafts 21 and 22 whenever the input shaft is rotatably driven. As illustrated in FIG. 1, the input gear 18 is connected to a conventional shift fork 39, which shift fork is controlled by the shift rod 37 for permitting input gear 18 to be shifted axially for selectively permitting direct driving engagement between the input shaft 16 and the main shaft 23.

The main shaft gears 31 and 32 are axially interconnected to form a gear pair and are connected to a conventional shift fork 36. The position of the shift fork 36 being controlled in a conventional manner by means of appropriate shift rods similar to rod 37. The main shaft gear pair 31-32 is thus shiftable axially relative to main shaft 23 in response to axial shifting of the fork 36 by said rod. However, the gears 31 and 32 are independently rotatable relative to one another. In a similar manner, the main shaft gears 33 and 34 are also axially interconnected so as to be axially shiftable as a pair by means of the shift fork 38, which shift fork is also controlled by appropriate shift means. The main shaft gear pair 33-34 is likewise and similarly axially movable relative to the main shaft 23 and independently rotatable.

Considering now the splitter auxiliary section 13, the main shaft 23 extends thereinto and is coaxially arranged with and piloted into an output shaft 58 which is in turn supported within the housing 13 by suitable bearings generally indicated at 59. Said auxiliary section further includes a plurality of countershafts 66 and 67 (FIG. 3) each having an identical grouping of countershaft gears thereon, of which two appear at 68 and 69 (FIG. 1). The first pair of countershaft gears 68 are disposed diametrically opposite and in continuous meshing engagement with the main shaft gear 71, which main shaft gear is floatingly supported by the forward pair of countershaft gears, one being the gear 68 for substantially consecutively encircling the main shaft 23. A further main shaft gear 72 is also floatingly and substantially consecutively supported relative to the main shaft 23 by the rearward pair of countershaft gears, one being the gear 69. Shift forks 73 and 74, respectively, are provided for effecting the shifting of gears 71 and 72 and said shift forks are operable by appropriate shift rods of which one appears at 76 for operation by any desired means such as the pressure cylinder 77. Appropriate control means 78, a presently known type, is provided for properly effecting and interrelating control of the shift means for the forward gears 18 and 31-34 and the splitter gears 71 and 72.

The yieldable clutch structures are arranged between the shiftable main shaft gears in both the main transmission and the auxiliary section and are provided with resilient means for urging engagement thereof as set forth in detail in the above mentioned U.S. Pat. Nos. 3,799,002 and 3,983,979. While clutch means utilizing relatively nondeformable blockers of the prior art are not identical with each other, they are generally similar and hence insofar as the present invention is concerned, it will be sufficient to describe only one of them in detail with the understanding that same may be applied to the other clutch units without difficulty by anyone skilled in the art. Therefore, for this purpose, referring to the positive jaw clutch unit positioned between the main shaft gear 72 and the main shaft 23 in the auxiliary transmission section, said jaw clutch unit is generally designated 41 and includes an annular clutch collar or clutch member 42 encircling the main shaft 23. The clutch collar 42 is provided with internal splines 43 which are disposed within corresponding external splines 44 provided on the main shaft 23 for rotation therebetween. However, the cooperating splines 43 and 44 permit the clutch collar 42 to freely slide axially relative to the shaft 23. A stop ring 46 is seated within a suitable groove formed on the external periphery of the shaft 23 and is disposed for contacting the clutch collar 42 and limiting the rightward axial movement thereof. The collar 42 is normally resiliently urged by means of a spring 47 into a butting engagement with the stop ring 46.

The clutch collar 42 is provided with external teeth 48 thereon which are adapted to meshingly engage the internal teeth 50 provided on one of the main shaft gears, such as gear 72, the internal teeth 50 forming the other member of clutch 41. The teeth 48 on the clutch collar 42 are tapered, as at 51, and in a similar manner the leading edge of the teeth 50 on the main shaft gear 72 are similarly tapered at 52. The tapered conical surfaces 51 and 52 each extend at an angle of preferably between 30° and 40° relative to the longitudinal axis of the main shaft 23. The exact degree of taper, and the advantages thereof, are explained in detail in U.S. Pat. No. 3,265,173. The other end of the spring 47 resiliently acts against a further clutch collar 53 (FIG. 1) which collar is identical to the collar 42 but is disposed so that it has the tapered leading ends of teeth facing in the opposite direction.

Further resilient, substantially identical, clutch assemblies are provided for the other shiftable gear sets but same are set forth in detail in the above incorporated patents and hence further description thereof is unnecessary here.

Referring to FIG. 4, a portion of each of a selected number, here three, of the teeth 48 are partially removed for permitting the presence of a blocking ring as hereinafter further described. Such partial removal leaves, however, a shortened tooth 49 for cooperation with the blocking ring.

Referring now to the relatively nondeformable blockers, which are illustrated in FIG. 5, one thereof is indicated generally at 81, and comprises a ring encircling the clutch member 42 and has an appropriate number, here three pairs, of radially inward projections 82 and 83, which when properly positioned will mate with the external teeth above mentioned. The inward projections or teeth 82 and 83 are contoured at their sides to lie snugly against the adjacent ones of the teeth 48 and are positioned to project into the spaces between a partially removed tooth 49 and the teeth 48 on each side thereof. Blocker ring 81 is thus splined to clutch member 42 for rotation therewith. Each pair of teeth 82 and 83 are circumferentially of less dimension than the corresponding circumferential spaces defined by the teeth immediately adjacent the partially removed teeth 49 and thus blocker ring 81 may be rotated in either a limited clockwise or counterclockwise direction relative to clutch member 42 from the position seen in FIG. 5 in which the space between teeth 82 and 83 aligns with partially removed tooth 49. Contact of either blocker tooth 82 or 83 by a clutch tooth 48 will limit such relative rotation and cause blocker 81 to rotate with clutch member 42. The space between the inwardly projecting teeth 82 and 83 is of a clearance distance wider than the corresponding circumferential dimension of the tooth 49 so that when properly aligned at synchronism (or more accurately, when the relative speeds of the clutch components cross synchronism) the teeth 82 and 83 will straddle the tooth 49 and the clutch member 42 can move axially through but not past blocker ring 81 to effect engagement with its corresponding clutch member integrally formed in a corresponding gear. As may be seen by reference to FIG. 8, the end faces of the blocker teeth 82 and 83 may be tapered.

As is described in greater detail by reference to U.S. Pat. Nos. 3,921,469 and 3,924,484, the radially inner side of ring 81 may be provided with an inwardly directed groove 54 which receives an annular resilient ring 55 which is normally of slightly less internal diameter than the external diameter of the teeth 48 so that when the parts are in the assembled condition, ring 55 is distorted slightly outwardly thereby to exert a light but definite pressure against the external surface of said teeth 48. Inasmuch as the ring 55 fits loosely and only in light frictional contact with the walls of the groove 54, this effects a significant resistance to axial movement between the blocker ring 81 and the clutch ring 42 but only an insignificant resistance to relative rotative movement therebetween.

A suitable conical surface 56 projects radially outwardly from the blocker ring 81 and is positioned for engagement with a similar conical surface 57 on a radially inner wall of the gear 72. The axial drive above mentioned is sufficient that the rotative driving effect of the surface 57 onto the blocker 81 is much greater than whatever rotative resistance may exist between the blocker 81 and the clutch member 42. A stop ring 60 limits movement of the blocker 81 away from the conical surface 57 when the clutch rings 42 moves out of engagement (leftwardly in FIG. 4). Blocker ring 81 will, with a certain amount of axial freedom, move axially with gear 72 and clutch member 50 integral with gear 72 as a result of contact with either surface 57 or ring 60.

The other two partially removed teeth corresponding to tooth 49 are indicated at 49A and 49B and internally extending teeth on the blocker ring corresponding to the teeth 82 and 83 are indicated at 82A and 83A for cooperation with the partial tooth 49A and at 82B and 83B for cooperation with the partial tooth 49B.

The operation of the blocker 41 is generally similar to that of known generally nondeformable blockers, and in particular is substantially identical to those nondeformable blockers described in U.S. Pat. No. 3,924,484. For example, assuming the gear 72 is rotating more rapidly than the clutch member 42, which, of course, rotates at the same speed as the main shaft 23, the blocker 81 will normally (ignoring for the moment the effect of the ring 55) tend to rotate with the gear 72, hence, lead the clutch member 42 and position the teeth 83, 83A, and 83B, in a position to interfere with the partial teeth 49, 49A, and 49B, respectively, to prevent axial clutching movement of the clutch component to the right. However, as the shaft 23 accelerates and a condition of synchronism is approached, the space between the inwardly projecting blocker teeth will become substantially centered with the partial teeth on the periphery of the clutch member 42 and upon reversal of the relative speeds, the blockers will no longer block and the clutch member 42 will move into clutching engagement in the usual manner.

With the gear 72 initially running slower than the shaft 23, the operation will be generally similar to that described above excepting that the blocker 81 will lag behind the clutch member 42 until there occurs a reversal of relative speeds, i.e., a passing through synchronous, at which time blocking will cease and clutching will again be completed in a manner already well known for blocking devices.

Considering now the effect of the compression or drag ring 55, it will be recognized that when there is no appreciable axial pressure rightwardly, as appearing in FIG. 4, on the blocker ring 81, there will be no appreciable friction between the conical surfaces 56 and 57 and hence no tendency for the blocker ring 81 to rotate with the gear 72. However, as the clutch member 42 commences to move axially rightwardly, the axial drag provided by the drag ring 55 urges the blocking ring 81 likewise axially to effect interengagement between the friction surfaces 56 and 57. Since the rotative driving force of the surface 57 onto the blocker ring is greater than the rotative resistance between the blocker ring and the clutch ring, the blocking ring 81 commences rotating with the gear 72 and does so prior to contact between the teeth of the blocker 81 and teeth of the clutch member 42.

Blocked transmissions, such as transmission 11 described above, utilizing substantially nondeformable blockers which are operable to block or permit a jaw clutch engagement dependent upon the rotative position of the blocker relative to one of the jaw clutch members are a considerable improvement over prior art devices. However, such blocked transmissions, when provided with clutch assemblies wherein the back-lash between the interengaging clutch teeth, such as teeth 48 and 50, is substantially equal to the back-lash (about 0.006 inches [0.015 cm]) in manually shifted nonblocked transmissions, such as is illustrated in U.S. Pat. Nos. 3,105,395 and 3,335,616, have tended to be somewhat unsatisfactory as the clutch teeth tend to deteriorate more rapidly than expected. In the present invention, the clutch tooth life is greatly increased by providing an increased back-lash between the interengageable clutch teeth 48 and 50. In the prior art devices, the back-lash, which is defined as the amount by which the width of a tooth space exceeds the thickness of an engaging tooth on the pitch circles, was generally about 0.006 inches (0.015 cm). In the present invention, Applicants have discovered that a back-lash of about 0.030 inches (0.076 cm) to 0.090 inches (0.228 cm), preferably about 0.060 inches (0.152 cm), between the clutch teeth 48 and 50 will result in sufficient axial penetration of the clutch teeth during an engagement operation to greatly decrease clutch tooth deterioration. Such a back-lash is five to fifteen times greater than the back-lash seen in prior art devices.

In FIGS. 6-9, the improved jaw clutch assembly A of the present invention is schematically illustrated. The assembly A comprises jaw clutch members 142 and 172 which are relatively movable in the vertical direction to illustrate axial movement and in the horizontal direction to illustrate rotational movement. The members 172 and 142 carry interengageable clutch teeth 150 and 148 respectively. Clutch member 142 is resiliently biased toward member 172 by spring 147. Clutch teeth 150 and 148 are separated by tooth spaces 200 and 202 respectively. Preferably, clutch teeth 150 and 148 are of an equal tooth thickness, 204, while tooth spaces 200 and 202 are of an equal width 206. The amount by which the tooth space width 206 exceeds the tooth thickness 204 is the back-lash 208.

In FIG. 6, the clutch members 172 and 142 have just passed through synchronous, and the blocker (not shown) has allowed clutch member 142 to move axially towards clutch member 172 under the bias of spring 147. As is represented by arrow 210, clutch member 142 is rotating relative to member 172, usually at an increasingly non-synchronous rate. Axial interengagement can not yet occur as the teeth 150 and 142 are not in alignment with tooth spaces 202 and 200 respectively.

In FIG. 7, due to the relative rotation between members 172 and 142, the teeth 150 and 148 have just come into alignment with the tooth spaces 202 and 200 respectively. At this point, the clutch member 142 will begin to move axially toward member 172 at a rate dependent upon the spring constant of spring 147, the mass of member 142 and the frictional resistance to axial movement of member 142.

In FIG. 8, the relative rotational movement has caused the side faces of teeth 150 and 148 to engage. The initial axial penetration of the teeth is indicated at 212 and is dependent on the axial rate of travel of member 142 and the time interval for the clutches to rotationally move to the position of FIG. 8 from the position of FIG. 7. Such time interval being, of course, dependent of the relative rotational speed and the backlash 208 between teeth 150 and 148. By providing a greater than normal back-lash, the initial axial penetration of the teeth 212 is sufficient to minimize deterioration of the teeth as the teeth come into contact.

In FIG. 9, a prior art clutch assembly PA is illustrated wherein the back-lash 308 is significantly smaller than back-lash 208 and thus the initial penetration 312 of the prior art assembly PA is considerably smaller than initial penetration 212 of assembly A, tending to cause deterioration of the clutch teeth 348 and 350 of the prior art assembly.

While the specific embodiment of the invention has been set forth for illustrative purposes, it is understood that the present disclosure of the preferred form has been made only by way of example and that numerous changes in the detail of construction and combination and arrangement of the parts may be resorted to without departing from the spirit and the scope of the invention as hereinafter claimed.

We claim:
1. An improved blocker and jaw clutch assembly for a blocked transmission of the type comprising a substantially non-deformable blocker ring splined to one of two axially engageable clutch members for rotation therewith, said blocker effective to sense non-synchronous rotation of said clutch members to block relative axial movement of one of said clutch members toward the other of said clutch members when said clutch members are not rotating at a substantially synchronous rate, one of said clutch members carrying axially and radially inwardly extending clutch teeth for interengagement with axially and radially outwardly extending clutch teeth carried by the other of said clutch members, the improvement comprising:

the backlash between said interengageable clutch members being in the range of five to fifteen times greater than the about 0.006 inch (0.015 cm) backlash normally utilized with axially interengageable clutch members for non-blocked transmissions and synchronized transmissions.

2. The improved blocker and jaw clutch assembly of claim 1 wherein said backlash is about ten times greater than the about 0.006 inch (0.015 cm) backlash normally utilized with axially interengageable clutch members for non-blocked transmissions and synchronized transmissions.

3. The improved blocker and jaw clutch assembly of claim 1 wherein said backlash between said interengageable clutch teeth is in the range of 0.030 inches (0.076 cm) to 0.090 inches (0.228 cm).

4. The improved blocker and jaw clutch assembly of claim 3 wherein said backlash is about 0.060 inches (0.152 cm).

5. The improved blocker and jaw clutch assembly of claim 1 wherein at least one of said jaw clutch members is resiliently biased toward the other of said jaw clutch members.

6. An improved, shiftable, blocked change speed transmission including a main shaft and at least one countershaft, multiple pairs of shiftable ratio gears arranged between said main shaft and said countershaft, with jaw clutch devices comprising first and second jaw clutch members for connecting at least one of at least some of said pairs of gears to one of said shaft, said jaw clutches including at least one resiliently loaded jaw clutch member being constantly resiliently urged toward engagement position with the other jaw clutch member and positively limited in its response to said urging, one of said jaw clutch members carrying axially and radially inwardly extending jaw clutch teeth for interengagement with axially and radially outwardly extending jaw clutch teeth carried by the other of said jaw clutch members, blocker means provided on at least some of said jaw clutches for preventing engagement thereof in the event of a sensed non-synchronous condition between the members thereof, the improvement comprising:

the backlash between said interengageable clutch teeth being in the range of about 0.030 inch (0.076 cm) to 0.090 inch (0.228 cm).

7. The improved shiftable change speed transmission of claim 6 wherein said backlash is about 0.060 inches (0.152 cm).

* * * * *